(12) United States Patent
Cai et al.

(10) Patent No.: US 10,907,706 B2
(45) Date of Patent: Feb. 2, 2021

(54) TELESCOPIC ADJUSTER

(71) Applicant: PEGATRON CORPORATION, Taipei (TW)

(72) Inventors: Ci-Hong Cai, Taipei (TW); Shih-Wei Hung, Taipei (TW); Wen-Chang Chuang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 129 days.

(21) Appl. No.: 16/286,243

(22) Filed: Feb. 26, 2019

(65) Prior Publication Data
US 2019/0331204 A1    Oct. 31, 2019

(30) Foreign Application Priority Data

Apr. 26, 2018   (TW) .............................. 107114147 A (51) Int. Cl.
*F16H 19/06*         (2006.01)
(52) U.S. Cl.
CPC ..... *F16H 19/0645* (2013.01); *F16H 19/0663* (2013.01)
(58) Field of Classification Search
CPC ......................... F16H 19/0645; F16H 19/0663
See application file for complete search history.

(56) References Cited

U.S. PATENT DOCUMENTS

| | | | | |
|---|---|---|---|---|
| 3,672,237 A | * | 6/1972 | Nagin | F16G 13/06 74/89.21 |
| 3,831,455 A | * | 8/1974 | Patrignani | F16G 13/20 74/89.21 |
| 5,102,375 A | | 4/1992 | Featherstone | |
| 6,224,037 B1 | * | 5/2001 | Novick | B66F 3/06 254/95 |
| 7,621,078 B2 | * | 11/2009 | Phelan | B66F 13/005 52/121 |
| 8,069,954 B2 | * | 12/2011 | Kempf | B66F 13/005 187/250 |
| 8,376,193 B2 | * | 2/2013 | Veltrop | B05C 17/0113 222/392 |

(Continued)

FOREIGN PATENT DOCUMENTS

| | | |
|---|---|---|
| TW | 296014 | 1/1997 |
| TW | M428186 | 5/2012 |

OTHER PUBLICATIONS

"Office Action of Taiwan Counterpart Application", dated Nov. 27, 2018, p. 1-p. 6.

*Primary Examiner* — David M Fenstermacher
(74) *Attorney, Agent, or Firm* — J.C. Patents (57) ABSTRACT

The telescopic adjuster includes a telescopic rod assembly, a driving unit, and a chain. The telescopic rod assembly includes a fixed tube and a driving tube, where the fixed tube is sleeved over the driving tube or the driving tube is sleeved over the fixed tube, the fixed tube is fixed to a housing, and the driving tube can extend or retract relative to the fixed tube. The driving unit includes a first motor and a first gear, where the first motor is configured to drive the first gear. The chain has one end wound around the first gear and the other end fixed to a top end of the driving tube. When the first motor drives the first gear to rotate, the first gear drives the chain to push or pull the driving tube so that the driving tube extends or retracts relative to the fixed tube.

9 Claims, 7 Drawing Sheets

(56) References Cited

U.S. PATENT DOCUMENTS

| | | | |
|---|---|---|---|
| 8,602,377 B2 | 12/2013 | Chiu | |
| 8,925,405 B2 * | 1/2015 | Kawabuchi | B25J 18/025 74/37 |
| 9,833,911 B2 * | 12/2017 | Yoon | B25J 9/06 |
| 9,970,517 B2 * | 5/2018 | Irwin | E05D 3/04 |
| 10,378,611 B2 * | 8/2019 | Seigneur | E05F 11/00 |
| 2011/0126650 A1 * | 6/2011 | Sorensen | F16G 13/20 74/89 |
| 2011/0225903 A1 | 9/2011 | Lounis et al. | |
| 2011/0308338 A1 * | 12/2011 | Schluckebier | F16H 19/0645 74/89.2 |
| 2013/0161472 A1 | 6/2013 | Chiu | |
| 2014/0216199 A1 * | 8/2014 | Maltby | G05G 1/085 74/522 |

* cited by examiner

TELESCOPIC ADJUSTER

CROSS-REFERENCE TO RELATED APPLICATION

This non-provisional application claims priority under 35 U.S.C. § 119(a) to Patent Application No. 107114147 filed in Taiwan, R.O.C. on Apr. 26, 2018, the entire contents of which are hereby incorporated by reference.

BACKGROUND

Technical Field

The application relates to an adjuster, and in particular, to a telescopic adjuster.

Related Art

A telescopic adjuster commonly used in the market mostly uses a mechanical electric telescopic rod, which uses a motor to drive a screw rod to rotate, to push a telescopic rod hidden inside to extend or contract.

A telescopic range of a general mechanical electric telescopic rod is limited by the length of a screw rod. A longer required telescopic distance indicates a longer matching screw rod. Therefore, in use, the electric telescopic rod needs to reserve a large space to accommodate the screw rod, resulting in a limitation of a volume design of the telescopic adjuster.

SUMMARY

The application provides a telescopic adjuster that can be disposed in a housing. The telescopic adjuster includes a telescopic rod assembly, a driving unit, and a chain. The telescopic rod assembly includes a fixed tube and a driving tube, where the fixed tube is sleeved over the driving tube or the driving tube is sleeved over the fixed tube, the fixed tube is fixed to the housing, and the driving tube can extend or retract relative to the fixed tube. The driving unit includes a first motor and a first gear, where the first motor is configured to drive the first gear to rotate. The chain has one end wound around the first gear and the other end fixed to a top end of the driving tube. When the first motor drives the first gear to rotate, the first gear drives the chain to push or pull the driving tube so that the driving tube extends or retracts relative to the fixed tube.

In an embodiment of the application, a tube diameter of the fixed tube is greater than that of the driving tube, so that the fixed tube is sleeved over the driving tube. A top end of the fixed tube has a first limiting portion, and a bottom end of the driving tube has a second limiting portion. When the driving tube extends relative to the fixed tube by a preset length, the first limiting portion abuts against the second limiting portion.

In an embodiment of the application, the driving tube further includes a hook disposed at the top end of the driving tube, and the chain is fixed to the hook.

In an embodiment of the application, the first gear is located below the telescopic rod assembly, and the housing has a guide block, where the guide block is located next to the first gear, and the chain is driven by the first gear and moves along a guide direction of the guide block.

In an embodiment of the application, the telescopic adjuster further includes a guide track, where the guide track is fixed in the housing and is stacked in the telescopic rod assembly, and the guide track is configured to guide a moving direction of the chain entering the telescopic rod assembly.

In an embodiment of the application, the telescopic rod assembly further includes at least one driven tube, where a tube diameter of the fixed tube is less than that of the driving tube and that of the at least one driven tube, the tube diameter of the driving tube is less than that of the at least one driven tube so that the driving tube is sleeved over the fixed tube, the at least one driven tube is movably sleeved over the driving tube, the at least one driven tube is connected to the driving tube, and the driving tube can drive the at least one driven tube to extend or retract relative to the fixed tube.

In an embodiment of the application, a top end of the at least one driven tube has a first limiting portion, a bottom end of the at least one driven tube has a second limiting portion, the bottom end of the driving tube has a third limiting portion, and a top end of the housing has a fourth limiting portion. When the driving tube extends relative to the at least one driven tube by a preset length, the third limiting portion abuts against the first limiting portion so that the driving tube can drive the at least one driven tube to extend relative to the fixed tube. When the at least one driven tube extends relative to the housing by another preset length, the second limiting portion abuts against the fourth limiting portion.

In an embodiment of the application, the housing has a guide block, and the driving unit further includes a second gear, where the second gear is located below the telescopic rod assembly, and the second gear is located between the guide block and the first gear. The first motor is configured to drive the second gear to rotate, and the second gear is configured to drive the chain leaving the first gear to pass through the guide block.

In an embodiment of the application, the housing has a guide block, and the driving unit further includes a second gear and a second motor, where the second gear is located below the telescopic rod assembly, and the second gear is located between the guide block and the first gear. The second motor is configured to drive the second gear to rotate, and the second gear is configured to drive the chain leaving the second gear to pass through the guide block.

In an embodiment of the application, the fixed tube further includes a guide track, where the guide track is configured to guide a moving direction of the chain entering the fixed tube.

Based on the foregoing descriptions, the chain in the telescopic adjuster of the application can be wound and accommodated on the first gear, the first motor of the driving unit can drive the first gear to rotate to push the chain to move, to push or pull the driving tube to move the telescopic rod assembly in a direction, and the driving tube is sleeved over the fixed tube, so that a volume of the telescopic adjuster can be greatly reduced.

To make the foregoing characteristics and advantages of the application more comprehensible, embodiments are further described below in detail with reference to accompanying drawings.

DETAILED DESCRIPTION OF THE EMBODIMENTS

Figure 1:
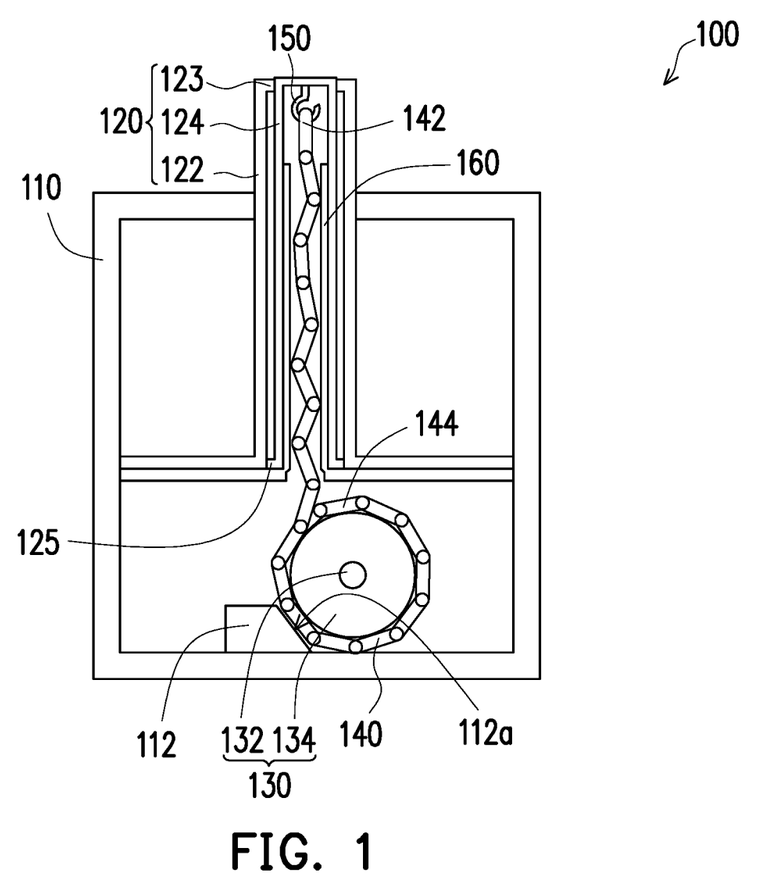
FIG. 1 is a schematic diagram of a telescopic adjuster according to an embodiment of the application.

FIG. 1 is a schematic diagram of a telescopic adjuster according to an embodiment of the application. Referring to FIG. 1, the telescopic adjuster 100 is disposed in a housing 110, where the telescopic adjuster 100 includes a telescopic rod assembly 120, a driving unit 130, and a chain 140. The telescopic rod assembly 120 includes a fixed tube 122 and a driving tube 124, where the fixed tube is sleeved over the driving tube or the driving tube is sleeved over the fixed tube, the fixed tube 122 is fixed to the housing 110, and the driving tube 124 can extend or retract relative to the fixed tube 122. The driving unit 130 includes a first motor 132 and a first gear 134, where the first motor 132 is configured to drive the first gear 134. The chain 140 has one end 144 wound around the first gear 134 and the other end 142 fixed to a top end of the driving tube 124.

When the first motor 132 drives the first gear 134 to rotate, the first gear 134 drives the chain 140 to push or pull the driving tube 124 so that the driving tube 124 extends or retracts relative to the fixed tube 122.

In another embodiment, as shown in FIG. 1, the telescopic rod assembly 120 is disposed in the housing 110 in a manner as to partially protrude from the housing 110. The fixed tube 122 and the driving tube 124 both are hollow tubes, a tube diameter of the fixed tube 122 is greater than that of the driving tube 124, and therefore the fixed tube 122 can be sleeved over the driving tube 124. A top end of the fixed tube 122 has a first limiting portion 123, and a bottom end of the driving tube 124 has a second limiting portion 125. When the driving tube 124 extends relative to the fixed tube 122 by a preset length, the first limiting portion 123 abuts against the second limiting portion 125. The movable second limiting portion 125 is stopped by the fixed first limiting portion 123, so that a length by which the driving tube 124 extends relative to the fixed tube 122 can be limited.

In another embodiment, as shown in FIG. 1, the driving tube 124 further includes a hook 150, where the hook 150 is disposed at the top end of the driving tube 124, and the chain 140 is fixed to the hook 150. The first gear 134 is located below the telescopic rod assembly 120, and the housing 110 has a guide block 112, where the guide block 112 is located next to the first gear 134, and the chain 140 is driven by the first gear 134 and moves along a guide direction of the guide block 112. Specifically, the guide block 112 has an oblique surface 112a, and the chain 140 is driven by the first gear 134 to move in a gap between the first gear 134 and the guide block 112 along an oblique direction provided by the oblique surface 112a of the guide block 112 as a guide direction.

In addition, the telescopic adjuster 100 may further include a guide track 160, where the guide track 160 is fixed in the housing 110 and is stacked in the driving tube 124 of the telescopic rod assembly 120, and the guide track 160 is configured to guide a moving direction of the chain 140 entering the telescopic rod assembly 120.

Figure 2:
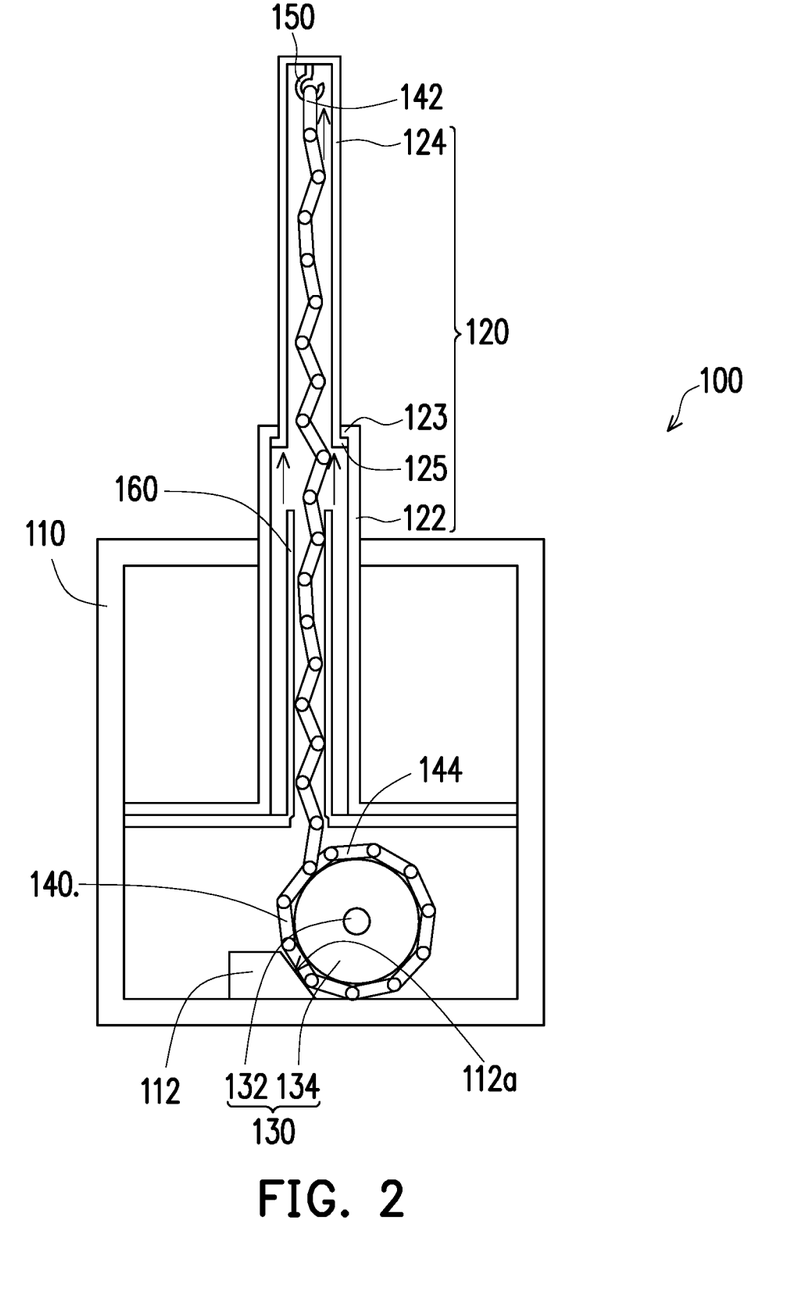
FIG. 2 is a schematic diagram showing that a driving tube in FIG. 1 extends relative to a fixed tube.

FIG. 2 is a schematic diagram showing that a driving tube in FIG. 1 extends relative to a fixed tube. Referring to FIG. 1 and FIG. 2 together, when the first motor 132 runs, the first motor 132 drives the first gear 134 to rotate clockwise, so that the chain 140 wound around the first gear 134 is released and moves along the guide direction of the guide block 112. After the chain 140 that is to enter the telescopic rod assembly 120 enters the guide track 160, the chain 140 is guided by the guide track 160 and is continuously stacked and pushes upward to push the driving tube 124 upward, so that the driving tube 124 extends relative to the fixed tube 122.

It should be noted that when the second limiting portion 125 of the driving tube 124 abuts against the first limiting portion 123 of the fixed tube 122, the movable second limiting portion 125 is limited by a stop of the fixed first limiting portion 123, and therefore the driving tube 124 cannot extend relative to the fixed tube 122 by a distance beyond the preset length. Therefore, disposition positions of the first limiting portion 123 and the second limiting portion 125 can be correspondingly changed according to requirements, to determine a distance by which the driving tube 124 extends relative to the fixed tube 122. In addition, an effect of limiting the length by which the driving tube 124 extends from the fixed tube 122 can be achieved by using the length of the chain 140.

Otherwise, when the first motor 132 drives the first gear 134 to rotate counterclockwise, the chain 140 is driven by the first gear 134 and moves downward along the guide track 160 to be wound and retracted by the first gear 134, and when the length of the chain 140 located in the telescopic rod assembly 120 becomes shorter, the chain 140 can pull the driving tube 124, so that the driving tube 124 retracts relative to the fixed tube 122.

As can be learned from the foregoing descriptions, for a conventional telescopic adjuster that uses a screw rod with a fixed length to push a telescopic rod, because the screw rod cannot be accommodated, a longer required length of the telescopic adjuster indicates a longer required screw rod, and a certain space needs to be provided for accommodating the screw rod, a volume of the conventional telescopic adjuster is limited by the length of the screw rod. Compared with the conventional telescopic adjuster, in a design of the telescopic adjuster 100 in this embodiment, a longer required length of the telescopic adjuster 100 indicates only an increase in the length of the chain 140, where the chain 140 configured to push the driving tube 124 can be partially wound around the first gear 134, and the driving tube is sleeved over the fixed tube, so that a volume of the telescopic adjuster 100 of this embodiment can be greatly reduced.

Moreover, the descriptions of the orientations of the foregoing clockwise, counterclockwise, top end, bottom end, and the like are merely used to illustrate the relative relationship between the components. It should be understood by a person skilled in the art that the descriptions of the orientations of the foregoing clockwise, counterclockwise, top end, bottom end, and the like vary with a standard change.

Figure 3:
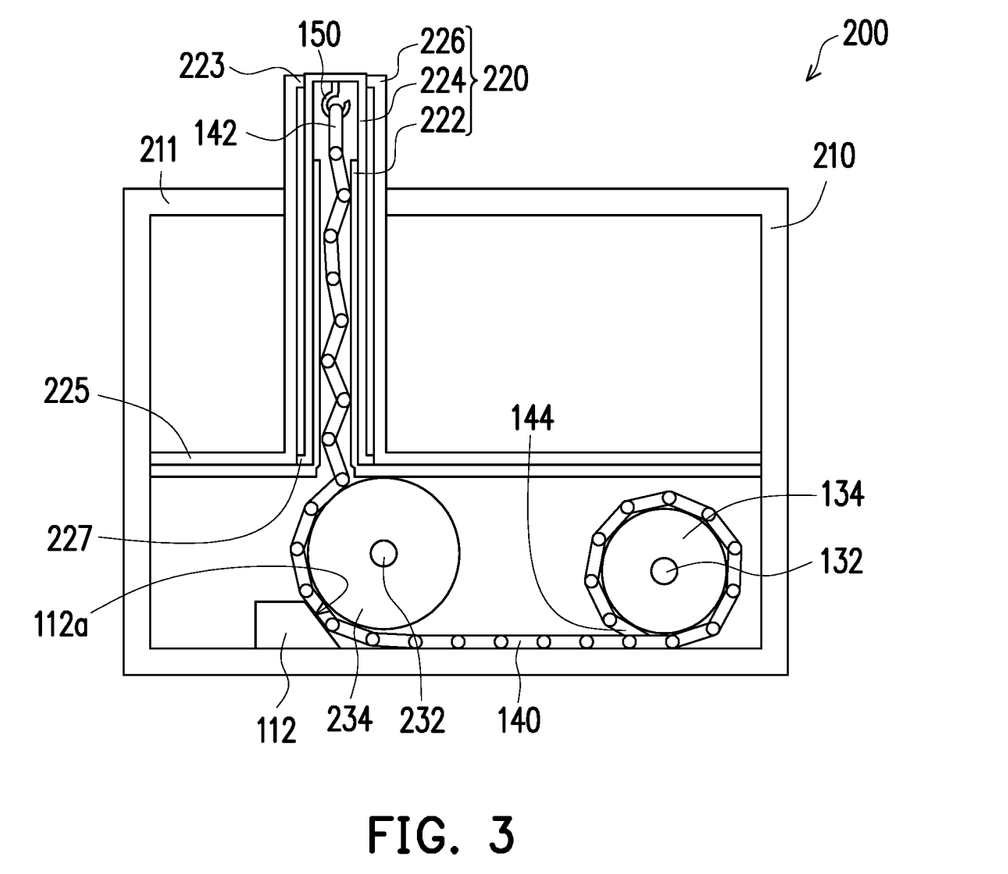
FIG. 3 is a schematic diagram of a telescopic adjuster according to another embodiment of the application.

FIG. 3 is a schematic diagram of a telescopic adjuster according to another embodiment of the application. This embodiment is substantially the same as the foregoing embodiment, and the same parts are not repeated. In the following description, same or similar components use the same or similar reference numerals.

This embodiment differs from the foregoing embodiment in that a telescopic rod assembly 220 of a telescopic adjuster 200 of this embodiment further includes at least one driven tube 226. The at least one driven tube 226, a fixed tube 222, and a driving tube 224 are all hollow tubes. The fixed tube 222 is fixed to a housing 210, a tube diameter of the fixed tube 222 is less than that of the driving tube 224 and that of the at least one driven tube 226, and the tube diameter of the driving tube 224 is less than that of the at least one driven tube 226, so that the driving tube 224 is sleeved over the fixed tube 222, the at least one driven tube 226 is movably sleeved over the driving tube 224, and the at least one driven tube 226 is connected to the driving tube 224. Therefore, the driving tube 224 is sleeved between the at least one driven tube 226 and the fixed tube 222. In this embodiment, the at least one driven tube 226 is illustrated by using one driven tube 226.

A top end of the foregoing driven tube 226 has a first limiting portion 223, a bottom end of the driven tube 226 has a second limiting portion 225, a bottom end of the driving tube 224 has a third limiting portion 227, and a top end of the housing 210 has a fourth limiting portion 211.

In addition, the driving unit may further include a second gear 234 disposed in the housing 210, where the second gear 234 is located below the telescopic rod assembly 220, and the second gear 234 is located between the guide block 112 and the first gear 134. The first motor 132 may drive both the first gear 134 and the second gear 234 to rotate in a same direction. When the first motor 132 drives the first gear 134 to rotate clockwise to release the chain 140 wound around the first gear 134, the second gear 234 also rotates clockwise to drive the chain 140 leaving the first gear 134 so that the chain 140 passes through a gap between the guide block 112 and the second gear 234.

In another embodiment, as shown in FIG. 3, the driving unit 130 may further include a second motor 232, where the second motor 232 may run in synchronization with the first motor 132 and drive the second gear 234 to rotate, and the first gear 134 and the second gear 234 rotate in the same direction.

It should be noted that in the foregoing embodiment or in this embodiment, the number of gears and motors to be disposed can be determined according to actual needs. For example, in the foregoing embodiment, two gears and two motors may be disposed together. Alternatively, two gears may be disposed, but only one motor may be disposed, and the motor is connected to a gear around which the chain 140 is to be wound, and the other gear serves as a driven gear and is driven to rotate with the chain 140 being retracted or released.

As shown in FIG. 3, the fixed tube 222, the driving tube 224, and the driven tube 226 of the telescopic adjuster 200 are in a retracted state. The chain 140 has one end 144 wound around the first gear 134 and the other end 142 hung on the hook 150. Therefore, one part of the chain 140 is fixed in the fixed tube 222 while the other part of the chain 140 is wound around the first gear 134.

Figure 4:
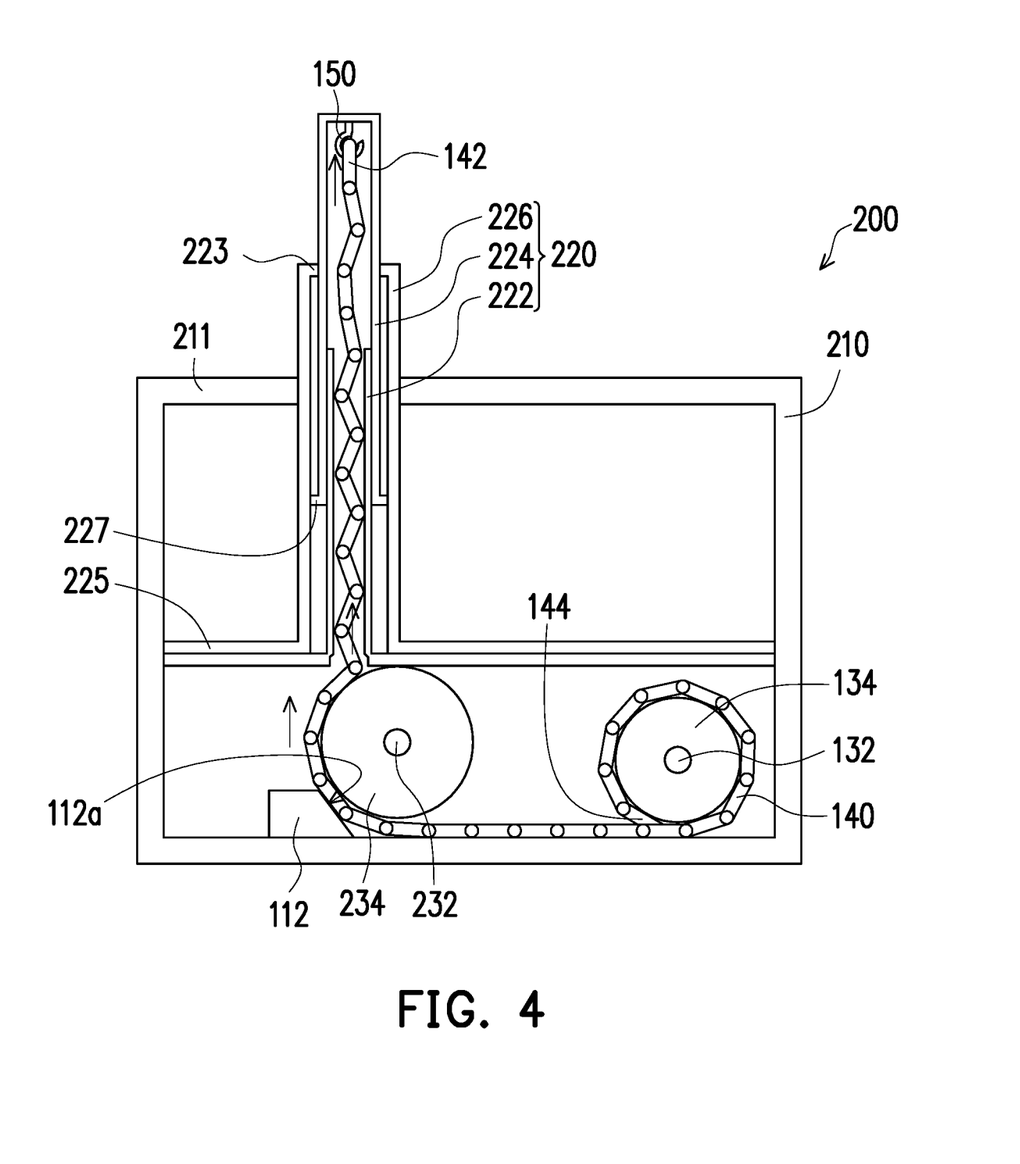
FIG. 4 is a schematic diagram showing that a driving tube of the telescopic adjuster in the embodiment of FIG. 3 is pushed by a chain to move upward.

FIG. 4 is a schematic diagram showing that a driving tube of the telescopic adjuster in the embodiment of FIG. 3 is pushed by a chain to move upward. When the first motor 132 and the second motor 232 rotate at the same time in the same direction, the first motor 132 drives the first gear 134 to rotate clockwise, and the second motor 232 also drives the second gear 234 to rotate clockwise. The chain 140 wound around the first gear 134 moves away from the first gear 134 with the rotation of the first gear 134, and the second gear 234 drives the chain 140 leaving the first gear 134. The chain 140 moves with the rotation of the second gear 234 and is guided by the guide block 112 to pass through the gap between the guide block 112 and the second gear 234. The fixed tube 222 of this embodiment further includes a guide track capable of providing a function of the guide track 160 of the foregoing embodiment. The guide track of the fixed tube 222 may be formed integrally with the fixed tube 222, or the guide track may be independently disposed in the fixed tube 222, or a part of the fixed tube 222 through which the chain 140 passes may serve as the guide track, so that the fixed tube 222 can guide a moving direction of the chain 140 entering the fixed tube 222. In other words, as the chain 140 is driven by the first gear 134 and the second gear 234 and is guided by the guide block 112, the chain 140 leaving the first gear 124 can enter the fixed tube 222 and is continuously stacked and pushes upward in the fixed tube 222 under guidance of the fixed tube 222, to further continuously push the driving tube 224 upward, so that the driving tube 224 extends relative to the fixed tube 222 and the driven tube 226.

Figure 5:
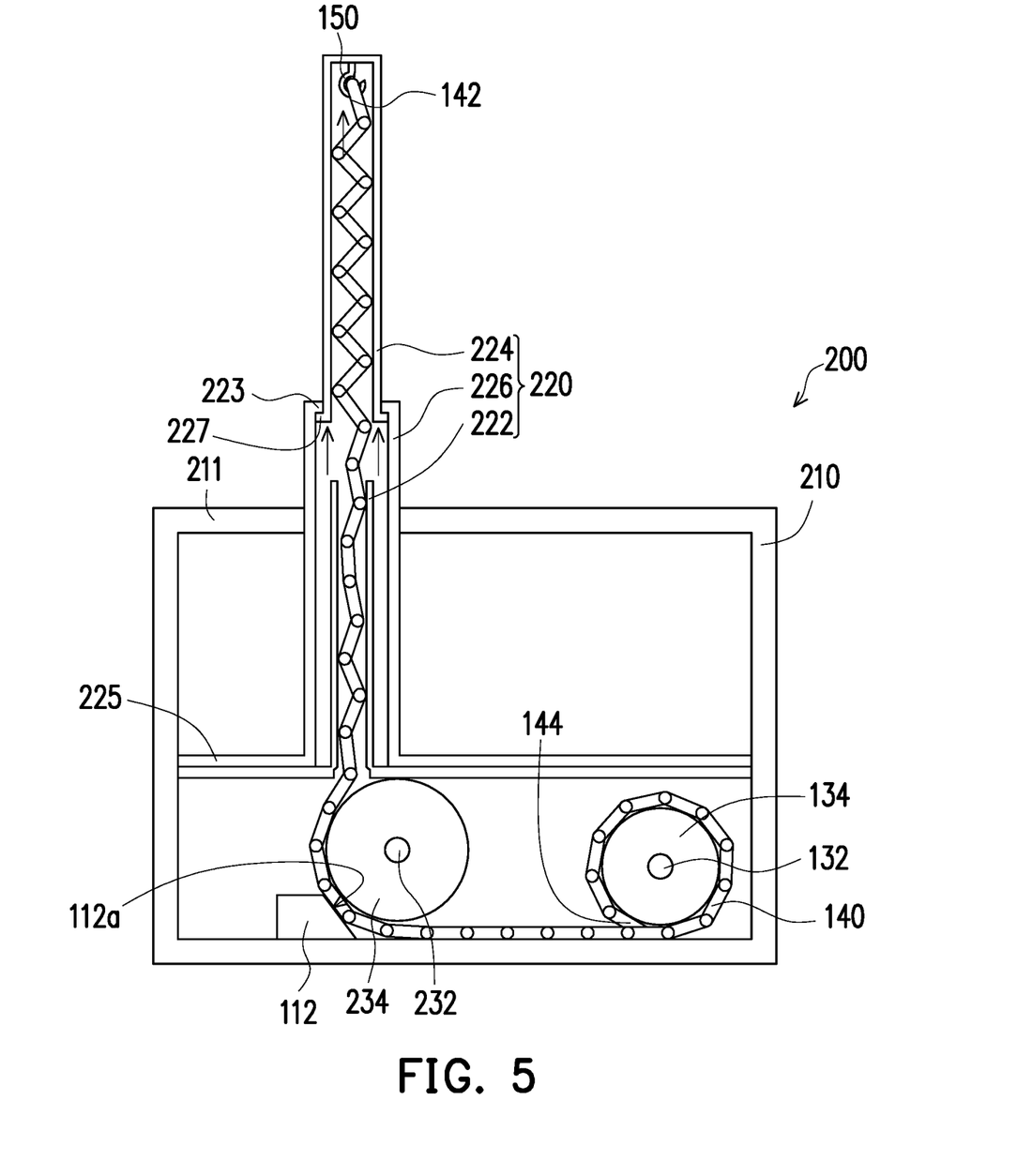
FIG. 5 is a schematic diagram showing that a third limiting portion of the driving tube of the telescopic adjuster in FIG. 4 is in contact with a first limiting portion of a driven tube.
Figure 6:
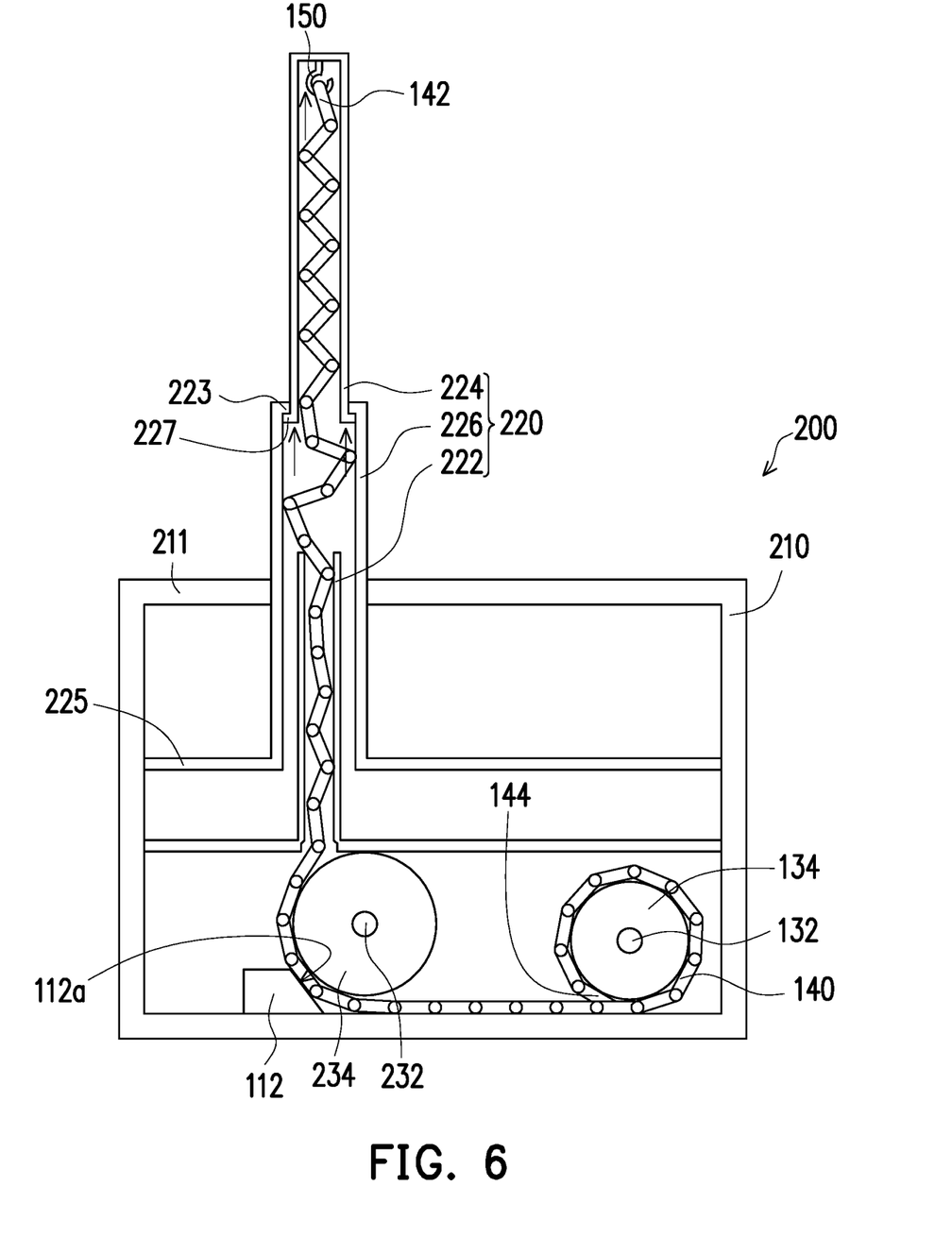
FIG. 6 is a schematic diagram showing that the driving tube of the telescopic adjuster in FIG. 5 drives the driven tube to move upward.

Referring to FIG. 5, FIG. 5 is a schematic diagram showing that a third limiting portion of the driving tube of the telescopic adjuster in FIG. 4 is in contact with a first limiting portion of a driven tube. When the driving tube 224 extends relative to the driven tube 226 by a preset length, the third limiting portion 227 abuts against the first limiting portion 223. The movable third limiting portion 227 is stopped by the fixed first limiting portion 223, so that the length by which the driving tube 224 extends relative to the driven tube 226 can be limited. Then, the first gear 134 and the second gear 234 still continue to drive the chain 140 to move, so that the driving tube 224 can drive the driven tube 226 to extend relative to the fixed tube 222. As shown in FIG. 6, FIG. 6 is a schematic diagram showing that the driving tube of the telescopic adjuster in FIG. 5 drives the driven tube to move upward. When the driven tube 226 extends relative to the housing 210 by another preset length, the second limiting portion 225 abuts against the fourth limiting portion 211. The movable second limiting portion 225 is stopped by the fourth limiting portion 211, so that a length by which the driven tube 226 extends relative to the fixed tube 222 can be limited.

As can be learned from the foregoing description, the telescopic adjuster 200 can achieve at least two-stage extension or retraction through the mutually sleeved fixed tube 222, driving tube 224, and driven tube 226, and a telescopic height may be limited by the following four factors: the length of the chain 140, disposition manners of the fixed tube 222, the driving tube 224, and the driven tube 226, the lengths of the fixed tube 222, the driving tube 224 and the driven tube 226, and disposition positions of limiting portions of the driving tube 224 and the driven tube 226.

Figure 7:
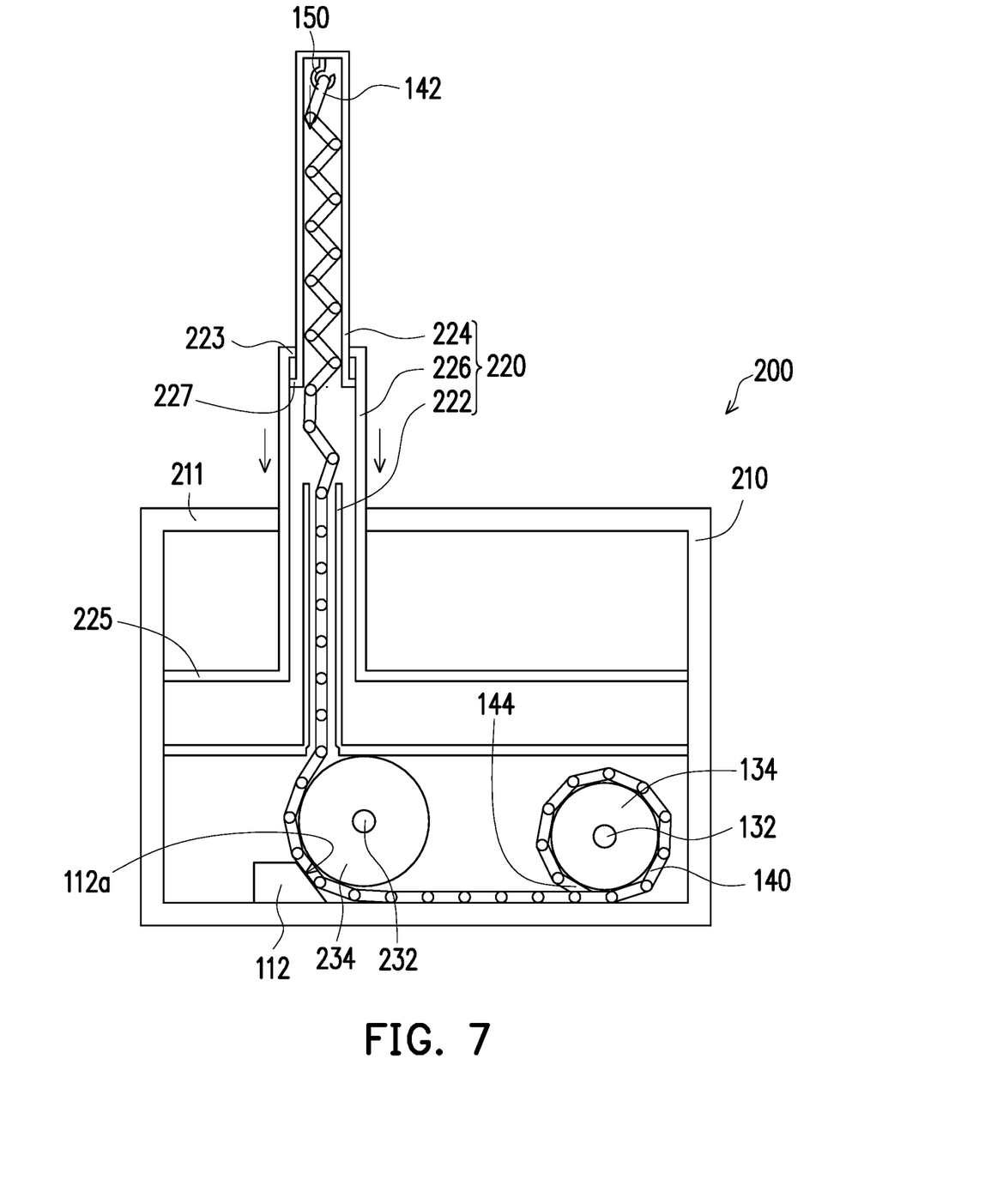
FIG. 7 is a schematic diagram showing that a chain of the telescopic adjuster in FIG. 6 retracts and drives the driving tube and the driven tube to move downward.

FIG. 7 is a schematic diagram showing that a chain of the telescopic adjuster in FIG. 6 retracts and drives the driving tube and the driven tube to move downward. Referring to FIG. 7, when the driving tube 224 and the driven tube 226 are retracted into the housing 210 of the telescopic adjuster 200, the first motor 132 and the second motor 232 can be enabled to drive the first gear 134 and the second gear 234 to rotate counterclockwise, and the chain 140 is driven by the first gear 134 and the second gear 234 to move downward along the fixed tube 22 so that the chain 140 can be retracted by the first gear 134. In addition, as the length of the chain 140 located in the telescopic rod assembly 220 becomes shorter, the chain 140 can pull the driving tube 224 so that the driving tube 124 and the driven tube 226 retract relative to the fixed tube 122.

To sum up, in the telescopic adjuster of the application, the chain that can be wound and accommodated on the gear is used to drive the driving tube (and the driven tube) to extend and retract. The chain can use the motor of the driving unit to drive the gear to rotate, to further push the chain to move to push the driving tube (and the driven tube) upward, or the chain is retracted to pull the driving tube (and the driven tube) downward, and the fixed tube and the driving tube (and the driven tube) are mutually sleeved, so that the telescopic adjuster of the application can effectively save space in a height direction, thereby reducing a volume of the telescopic adjuster.

Although the application is disclosed above by using the embodiments, the embodiments are not intended to limit the application. Any person of ordinary skill in the art may certainly make some variations and modifications without departing from the spirit and the scope of the application. Therefore, the protection scope of the application shall be subject to the appended claims.

What is claimed is:

1. A telescopic adjuster, disposed in a housing, and the telescopic adjuster comprising:
    a telescopic rod assembly, comprising a fixed tube and a driving tube, wherein the fixed tube is sleeved over the driving tube or the driving tube is sleeved over the fixed tube, the fixed tube is fixed to the housing, and the driving tube can extend or retract relative to the fixed tube;
    a driving unit, comprising a first motor and a first gear, wherein the first motor is configured to drive the first gear to rotate; and
    a chain, having one end wound around the first gear and the other end fixed to a top end of the driving tube, wherein when the first motor drives the first gear to rotate, the first gear drives the chain to push or pull the driving tube so that the driving tube extends or retracts relative to the fixed tube, wherein the driving tube further comprises a hook disposed at the top end of the driving tube, and the chain is fixed to the hook.

2. The telescopic adjuster according to claim 1, wherein a tube diameter of the fixed tube is greater than a tube diameter of the driving tube, so that the fixed tube is sleeved over the driving tube, a top end of the fixed tube has a first limiting portion, a bottom end of the driving tube has a second limiting portion, and when the driving tube extends relative to the fixed tube by a preset length, the first limiting portion abuts against the second portion.

3. The telescopic adjuster according to claim 1, wherein the first gear is located below the telescopic rod assembly, and the housing has a guide block, wherein the guide block is located next to the first gear, and the chain is driven by the first gear and moves along a guide direction of the guide block.

4. The telescopic adjuster according to claim 1, further comprising a guide track, wherein the guide track is fixed in the housing and stacked in the telescopic rod assembly, and the guide track is configured to guide a moving direction of the chain entering the telescopic rod assembly.

5. The telescopic adjuster according to claim 1, wherein the telescopic rod assembly further comprises at least one driven tube, wherein a tube diameter of the fixed tube is less than a tube diameter of the driving tube and a tube diameter of the at least one driven tube, the tube diameter of the driving tube is less than the tube diameter of the at least one driven tube so that the driving tube is sleeved over the fixed tube, the at least one driven tube is movably sleeved over the driving tube, the at least one driven tube is connected to the driving tube, and the driving tube can drive the at least one driven tube to extend or retract relative to the fixed tube.

6. The telescopic adjuster according to claim 5, wherein a top end of the at least one driven tube has a first limiting portion, a bottom end of the at least one driven tube has a second limiting portion, a bottom end of the driving tube has a third limiting portion, a top end of the housing has a fourth limiting portion, when the driving tube extends relative to the at least one driven tube by a preset length, the third limiting portion abuts against the first limiting portion, so that the driving tube drives the at least one driven tube to extend relative to the fixed tube, and when the at least one driven tube extends relative to the housing by another preset length, the second limiting portion abuts against the fourth limiting portion.

7. The telescopic adjuster according to claim 1, wherein the housing has a guide block, and the driving unit further comprises a second gear, wherein the second gear is located below the telescopic rod assembly, the second gear is located between the guide block and the first gear, the first motor is configured to drive the second gear to rotate, and the second gear is configured to drive the chain leaving the first gear to pass through the guide block.

8. The telescopic adjuster according to claim 1, wherein the housing has a guide block, and the driving unit further comprises a second gear and a second motor, wherein the second gear is located below the telescopic rod assembly, the second gear is located between the guide block and the first gear, the second motor is configured to drive the second gear to rotate, and the second gear is configured to drive the chain leaving the first gear to pass through the guide block.

9. The telescopic adjuster according to claim 5, wherein the fixed tube further comprises a guide track, wherein the guide track is configured to guide a moving direction of the chain entering the fixed tube.

\* \* \* \* \*